Dec. 12, 1967  E. J. SAXL  3,357,253
DEVICE AND METHOD FOR MEASURING GRAVITATIONAL
AND OTHER FORCES
Filed Feb. 2, 1965  11 Sheets-Sheet 1

Fig. 1.

Inventor:
Erwin J. Saxl,
by Arthur D. Thomson
Attorney

Dec. 12, 1967 E. J. SAXL 3,357,253
DEVICE AND METHOD FOR MEASURING GRAVITATIONAL
AND OTHER FORCES
Filed Feb. 2, 1965 11 Sheets-Sheet 2

Fig. 2.

Inventor:
Erwin J. Saxl,
by Arthur D. Thomson
Attorney

Dec. 12, 1967   E. J. SAXL   3,357,253
DEVICE AND METHOD FOR MEASURING GRAVITATIONAL
AND OTHER FORCES
Filed Feb. 2, 1965   11 Sheets-Sheet 3

Inventor:
Erwin J. Saxl,
by Arthur D. Thomson
Attorney

Dec. 12, 1967   E. J. SAXL   3,357,253
DEVICE AND METHOD FOR MEASURING GRAVITATIONAL
AND OTHER FORCES
Filed Feb. 2, 1965   11 Sheets-Sheet 4

Inventor:
Erwin J. Saxl,
by Arthur D. Thomson
Attorney

Dec. 12, 1967 E. J. SAXL 3,357,253
DEVICE AND METHOD FOR MEASURING GRAVITATIONAL
AND OTHER FORCES
Filed Feb. 2, 1965 11 Sheets-Sheet 8

Inventor:
Erwin J. Saxl,
by Arthur D. Thomson
Attorney

Dec. 12, 1967  E. J. SAXL  3,357,253
DEVICE AND METHOD FOR MEASURING GRAVITATIONAL
AND OTHER FORCES
Filed Feb. 2, 1965  11 Sheets-Sheet 9

Fig.12.

Inventor:
Erwin J. Saxl,
by Arthur D Thomson
Attorney

Dec. 12, 1967            E. J. SAXL            3,357,253
DEVICE AND METHOD FOR MEASURING GRAVITATIONAL
AND OTHER FORCES
Filed Feb. 2, 1965            11 Sheets-Sheet 10

Inventor:
Erwin J. Saxl,
by Arthur D. Thomson Attorney

United States Patent Office 3,357,253
Patented Dec. 12, 1967

3,357,253
DEVICE AND METHOD FOR MEASURING
GRAVITATIONAL AND OTHER FORCES
Erwin J. Saxl, Harvard, Mass. 01451
Filed Feb. 2, 1965, Ser. No. 432,068
9 Claims. (Cl. 73—382)

ABSTRACT OF THE DISCLOSURE

A pendulum type of device for measuring gravitational and other forces, with a photoelectrically operated timer for timing individual oscillations of the pendulum.

A restoring device brings the pendulum to a position corresponding to a condition of predetermined potential energy at the start of each oscillation. The timer is inoperative during a portion of each oscillation and the restoring device operates only during that time. A circuit for charging the pendulum electrically on alternate oscillations is provided. The pendulum may be either a plane pendulum or a torque pendulum.

---

This invention relates to the measurement of gravitational and other forces, and more particularly to measuring devices of the type employing a pendulous mass as a detecting element.

It is well known that the acceleration due to gravity, customarily referred to as the gravitational constant $g$, varies in different locations on the earth's surface because of variations in density of the underlying geological structure, the geographic latitude, or other factors. Measurement of the variations in $g$ is extensively used as one of the means of geophysical exploration for determining the location of oil and mineral deposits, as well as for scientific purposes. The measuring instruments used are of two general classes, those employing a static mass, such as a weighted arm or liquid column, and those employing an oscillating body, such as a pendulum. The customary procedure when using a pendulum or equivalent device as the detecting element is to count the number of oscillations performed by the body during a predetermined period of time. The time interval selected for performing the measurement is normally much longer than the natural period of oscillation of the body, for example, several hundred or even several thousand times the period, to insure accuracy. The average period of the pendulum over the selected interval is then determined, by dividing the interval by the number of oscillations, and from this data the value of $g$ at the location can be determined by well-known calculations.

Gravimeters of the pendulum type are known as "primary" instruments because they permit the value of $g$ to be determined without calibration or reference to any other gravimetric instrument. The static mass type of gravimeter is known as a "secondary" instrument, because it must be calibrated against a primary instrument such as a pendulum. Secondary instruments have a limited range and are inherently inferior to primary instruments from the standpoint of accuracy. However, the secondary type of instrument permits readings to be made quickly, and thus is more suitable than the usual pendulum type for many purposes such as surveying and exploration.

The principal object of this invention is to provide a primary instrument for measuring gravitational and similar forces which retains the inherent advantages of a primary instrument, but permits measurements to be made as quickly as with a secondary instrument. Another object is to provide a device and method for making such measurements singly and in rapid succession. Still another object is to provide a device and method for detecting fluctuating forces of short duration occurring within the earth, such as the oscillations produced by underground explosions and earthquakes. Still another object is to provide a device and method for investigating the behavior of an electrically charged body oscillating in the earth's gravitational field and comparing its behavior directly with that of the body when uncharged.

The device, as here illustrated, consists in general of a pendulum, and means for accurately timing a portion of a single oscillation of the pendulum. The device also includes a restoring mechanism for starting the pendulum from the same position and therefore with the same potential energy, for each oscillation to be measured. The timing, in the embodiment of the invention here disclosed, is accomplished by means of a photoelectric cell which actuates an electronic counting device when the pendulum swings past a certain position. Means for applying an electric charge to the swinging pendulum is also provided. Preferably the device also includes an automatic circuit which causes the pendulum to be repeatedly restored to its initial position, released, and timed, so that measurements may be made in rapid succession, and selectively charged with positive or negative voltage or grounded.

A large number of observations have been made with devices of the type here described. Certain of these observations reveal fluctuations in the gravitational acceleration at a given location which are not detected by other devices such as seismographs. Observations made when the pendulum is charged electrically also show periodic similar fluctuations. The behavior of the electrically charged pendulum differs in significant ways from that of the grounded pendulum. Furthermore, the period of the pendulum varies according to the voltage of the charge in a characteristic manner, so that an instrument which has been calibrated against standard voltages can be used as an accurate voltmeter of extended range.

The device and method here described are especially suited for further exploration of the hitherto unobserved phenomena just described, because measurements made during short, individual time intervals can reveal short term variations which present gravimetric instruments are incapable of detecting. The device and method may, however, be used for essentially the same purposes as present gravimeters and has certain advantages over both the static and the oscillating types. This device is not subject to static friction, for example, which is a source of error in static or weighted arm types of gravimeters. At the same time the device produces a rapid measurement as compared to devices which average the period of an oscillating body over a large number of oscillations. Furthermore, decay in amplitude of the oscillation is eliminated as a source of error because each measured oscillation is started from the same point, and therefore with the same potential energy. Other advantages and novel features will be apparent from the following detailed description.

In the drawings illustrating the invention:

FIG. 7 is an electrical schematic diagram of the timing circuit;

The torque pendulum

The torque pendulum which is used as the primary detecting element on the instrument consists essentially of a disk suspended by a conductive filament-like suspension of a diameter which may be considered negligible with respect to that of the disk. The weight and diameter of the disk are sufficiently large to make the moment of inertia of the suspension negligible in computing the period of the system. According to conventional calculations, the period T of such a system in free rotary oscillation follows the relationship $$T = 2\pi\sqrt{\frac{Il}{\alpha}}$$

where I is the moment of inertia of the system, l the length of the suspension, and $\alpha$ the torsional constant, a constant determined by the physical characteristics of the suspension.

The moment of inertia of a disk or cylinder is calculated by the formula $$I = \frac{Wa^2}{2g}$$

where W is the weight of the disk, $a$ the radius, and $g$ the acceleration due to gravity at the location and time of measurement. Assuming $W=MG$, where G is the conventional standard value of g and M the mass, then $$I = \frac{MGa^2}{2g}$$

By combining and solving these equivations, g at the particular location is calculated as $$g = \frac{2\pi^2 MGa^2 l}{T^2\alpha}$$

For a particular torque pendulum of known and stable physical characteristics, therefore, the value of g can be calculated from the observed period of oscillation by the formula $$g = \frac{\text{Constant}}{T^2}$$

The physical construction of the pendulum and associated parts of the instrument is shown in FIGS. 1 through 4. This part of the instrument is supported on four adjustable feet in the form of levelling screws 20 threaded into collars 21. The screws rest on shock absorbent rubber pads 22 on a concrete slab or floor 23. Collars 21 are attached to a rectangular base plate 24. Four collars 25 are mounted on the upper surface of plate 24, and receive the lower ends of four rods 26 which are made of electrically insulating material of low coefficient of expansion, such as glass or quartz.

Figure 1:
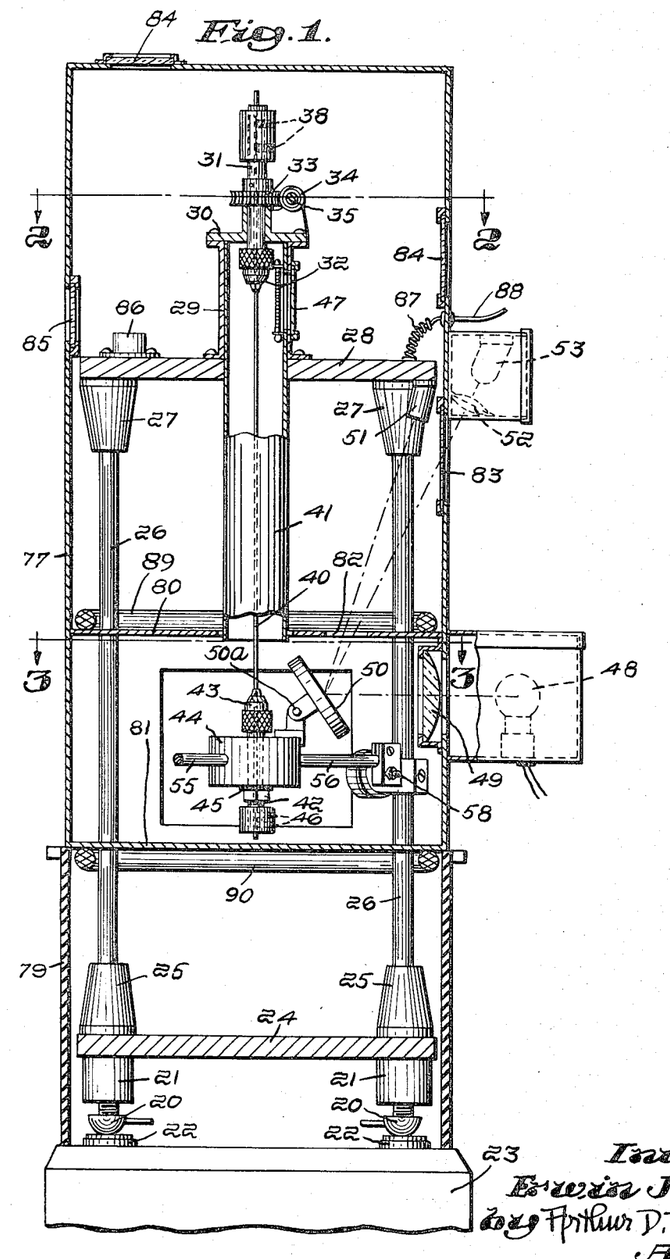
FIG. 1 is a vertical cross-section of a torque pendulum constructed according to the invention, taken generally along line 1—1 of FIG. 3, parts of the suspension and shielding being shown in cross-section along the axis of the suspension.
Figure 2:
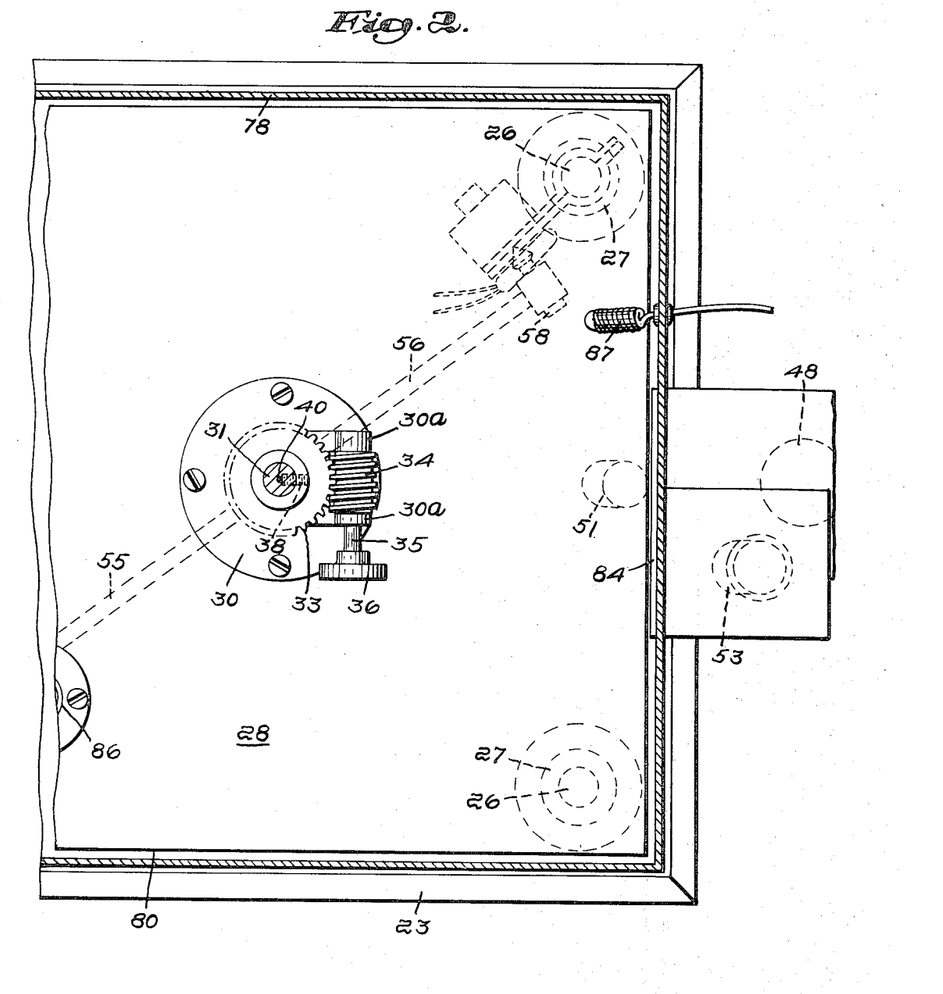
FIG. 2 is an enlarged fragmentary cross-section taken along the line 2—2 of FIG. 1.
Figure 3:
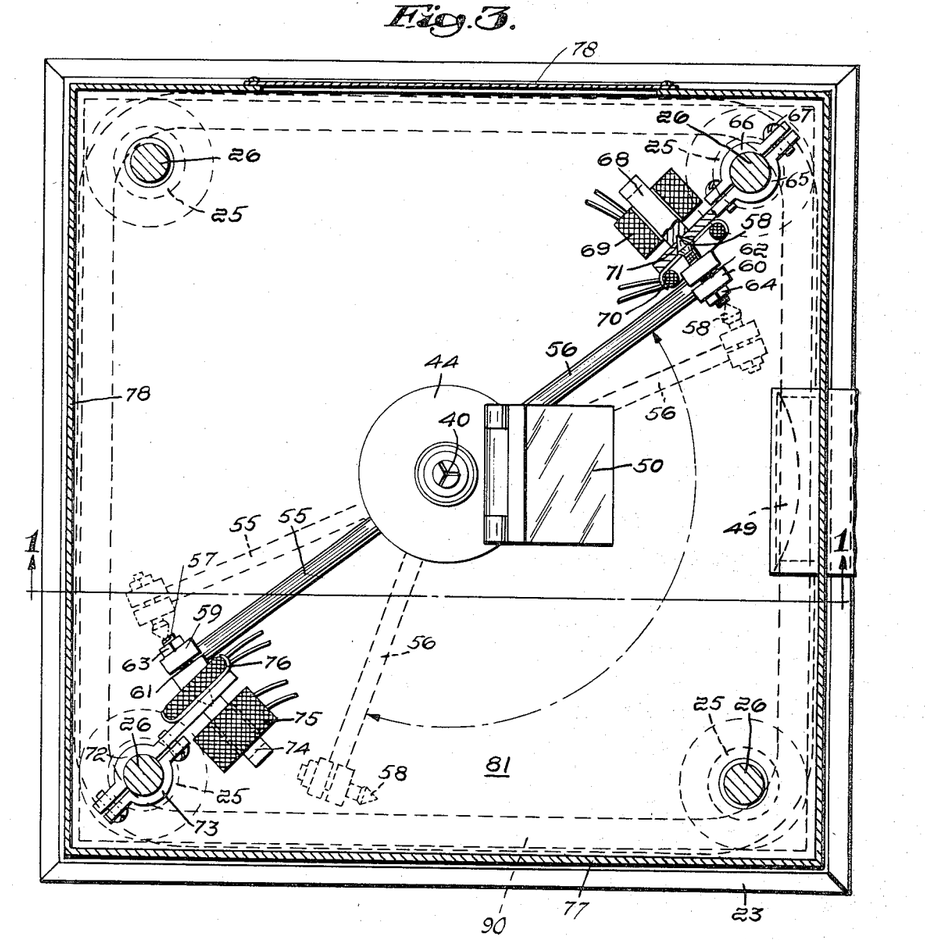
FIG. 3 is an enlarged cross-section taken along line 3—3 of FIG. 1.

The upper ends of insulating rods 26 fit into four collars 27 which are attached to the under side of a suspension plate 28. A tubular bracket 29 is mounted on plate 28 and supports a flanged tubular bracket 30. A tubular sleeve 31 is rotatably mounted in bracket 30 and carries a collet 32, of generally conventional construction on its lower end. A worm gear 33 is fixed to sleeve 31 and bears on the upper end of bracket 30. A worm 34 engages gear 33 and is mounted on a shaft 35, journalled in lugs 30a of bracket 30 and turned by means of a hand knob 36.

A filament 40 which constitutes the suspension of the pendulum is gripped in collet 32. The filament extends up through sleeve 31 and is clamped by two set screws 38 which serve as an emergency holder in case of slippage of the collet. A tubular shield 41 of conductive material is mounted inside bracket 29 and extends down through plate 28, surrounding filament 40 through most of its length. At its lower end the wire runs through a tubular sleeve 42 and is gripped by a collet 43 similar to collet 32. Sleeve 42 passes through a short cylinder or disk 44 which constitutes the pendulum weight. A nut 45 engages sleeve 42 and supports the disk. The filament 40 is held in an emergency clamp at the bottom consisting of set screws 46.

The filament 40 is preferably made of a material having an extremely low coefficient of expansion and a substantially constant modulus of elasticity over a wide range of temperatures. Quartz is a suitable material. Another material which may be used is a properly heat-treated steel alloy wire having the desired characteristics of dimensional and elastic stability with temperature. The disk 44 is also preferably made of material of low coefficient of expansion, such as heat-resistant glass or ceramic. The critical dimensions and physical characteristics of the pendulum may thus be kept practically constant without the need of extremely close temperature control. A thermometer 47 is mounted inside shield 41, however, so that the internal temperature of the instrument may be observed. It is desirable to make measurements with the instrument at a reasonably uniform temperature to insure maximum accuracy. The apparatus may be mounted in a vacuum chamber if desired. The pendulum disk and its suspension must be electrically conductive for making observations with a charged pendulum. Therefore, if these parts are made of non-conductive material they should be coated with gold, silver, or other conductive material. For observation with an uncharged pendulum, conductivity of the pendulum and suspension is unnecessary.

A light source 48 is mounted to one side of the pendulum, and projects a beam of light through a collimating lens 49 on to an accurately ground front surfaced mirror 50 which is mounted on the pendulum by means of an adjustable mounting 50a. In one rotational position of the pendulum, the light beam is reflected on to a photocell 51, and in another position the beam passes through a condensing lens 52 to a photocell 53. The photocells operate the restoring and timing circuits which will be described later.

A pair of rods 55 and 56, of insulating material such as quartz, are mounted on the disk 44 and project radially with respect to the disk. These rods carry shoes 57 and 58, respectively. As shown in detail in FIG. 4, the shoe 58 has a conical end and is threaded into a block 60 which is slidably mounted on rod 56 and clamped by means of a screw 62 passing through a split in the upper part of the block. The shoe is locked to the block by means of a nut 64. Shoe 57 is similarly mounted in a block 59 clamped on to arm 55 by screw 61, and is locked by a nut 63. The radial position of the shoes on the rods and the circumferential position of the conical ends can thus be accurately adjusted.

Figure 4:
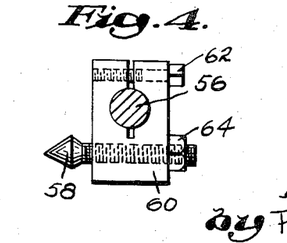
FIG. 4 is an enlarged detail view of one of the restoring shoe assemblies.

Mounted on a diagonally opposite pair of the legs 26 are a pair of electromagnet assemblies to which the shoes are attracted. The assembly which cooperates with shoe 58 consists of a pair of collar plates 65 and 66 which are clamped around the adjacent rod 26 by means of bolts 67, a magnetic core 68 attached to an extension of plate 65, an energizing coil 69 wound around core 68, and a de-gaussing coil 70 mounted on plate 65. Plate 65 has a conical recess 71 in which the end of shoe 58 may be received. The other magnet assembly is similar in construction and consists of collar plates 72 and 73, core 74, energizing coil 75, and de-gaussing coil 76. The de-gaussing coils are continuously energized, when the instrument is in use, from any suitable A.C. source (not shown). The energizing coils 69 and 75 are energized by the restoring circuit, as will be described later.

The pendulum and its supporting structure are enclosed in a conductive housing 77 having an access panel 78 on one side. The housing rests on a base 79 of insulating material. The housing carries shields 80 and 81 extending across the interior above and below disk 44. These shields are provided with suitable openings to admit rods 26 and filament 40. Shield 80 has an opening 82 for passage of the light beam from the mirror to the photocells. Housing 77 has an opening for mounting lens 49 and suitably placed windows 83, 84 and 85. The latter two windows permit observation of thermometer 47 and a two-way level 86 mounted on plate 28. Housing 77 and its shields are out of physical contact with the pendulum support but the housing is electrically connected to plate 28 by a flexible coiled wire 87. A cable 88 is connected by a suitable terminal to housing 77.

A pair of de-gaussing coils 89 and 90 are mounted above and below shields 80 and 81, respectively, to minimize the effect of stray magnetic fields.

Figure 5:
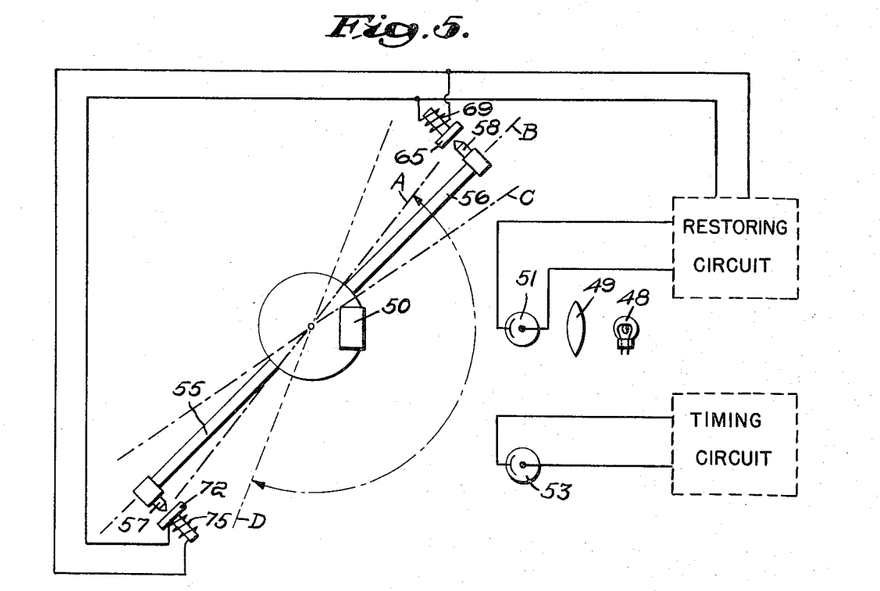
FIG. 5 is a schematic view illustrating the relative angular positions, in the horizontal plane, of the restoring arms, light source, and photocells.

The rotary swing of the pendulum, as illustrated schematically in FIG. 5, starts from the position in which the shoes 57 and 58 are seated in the recesses in plates 72 and 65, respectively. In this position rods 55 and 56 are aligned with line A. The pendulum swings until the rods are aligned with line D which represents the reversing point in the oscillation. By adjusting the rotary position of collet 32, from which the pendulum is suspended, by means of gear 33 and worm 34, the position of rest of the pendulum, that is the position of no twist in the wire, may be adjusted. The rest position should be set so that rods 55 and 56 lie approximately on a line half-way between the start A and the reverse point D. An amplitude of approximately 170° permits a long enough swing for accurate timing without danger of the shoes 57 and 58 hitting the opposite magnet assemblies.

As the rods 55 and 56 reach the position of line C, the light beam is reflected by mirror 50 on to photocell 53. This photocell actuates a timing circuit to start a decade counter, as will be later described. When the pendulum swings past this same point on the return swing, light falling on photocell 53 actuates the timing circuit again to stop the counter. The duration of the swing of the pendulum over the portion of its amplitude represented by the angular distance from C to D and back is thus measured. By determining the relationship of the measured portion of the path to the average total amplitude of the particular pendulum, a formula can be readily arrived at for determining g from the measurements indicated by the counter, which may be calibrated to yield readings directly in terms of seconds. For many purposes, however, a plot of the counter readings indicating the variations in the time measurements, rather than absolute values, is sufficient for study of the phenomena detected by the pendulum.

When rods 55, 56 reach the position of line B on the return swing, light falling on photocell 51 operates the restoring circuit which energizes coils 69 and 75. Photocell 51 is preferably placed so that shoes 57 and 58 are about an inch away from their respective magnet assemblies at this point. Upon energization of coils 69 and 75 the shoes are attracted to the magnets and the pendulum is brought to rest at the start position A. The restoring circuit includes a time delay device, as will be described, so that the pendulum is held in position A for a predetermined time, and then released for the next oscillation. In each oscillation to be measured the pendulum is thus started from rest at exactly the same position and therefore with the same potential energy. As the pendulum starts each oscillation, the shoes 57, 58 pass through de-gaussing coils 70 and 76 which remove any residual magnetism.

The pendulum may be initially started by turning it by hand to the start position A. Thereafter the restoring and programming circuits, to be described, provide automatic operation for as long a period as desired.

*The timing circuit*

The timing circuit, which measures the time for the pendulum to swing from C to D and back to C again, is illustrated in FIG. 7. The photocell 53 is connected as one arm of a bridge circuit consisting of resistors 100, 101, and 102. Resistor 102 is adjustable so that the bridge may be adjusted to the desired operating conditions. The bridge is supplied with D.C. by a battery 103, or other stable D.C. voltage source, which is connected to the input junctions 104 and 105. The output junctions 106 and 107 are connected to the input terminals 108 and 109 of an electronic counter 110. The photocell is bridged by a condenser 99.

The counter is of a commercially available type, known generally as an events-per-unit time meter, using a crystal controlled oscillator as a source of standard frequency. An example of such a meter is the Model 7160 Universal Eput and Timer Meter made by the Berkeley Division of Beckman Instruments, Inc. This meter may be used either to count the number of input pulses received in a specified time period, or in the inverse manner to measure the period between reception of two input pulses. The meter is provided with automatic resetting mechanism and yields a digital indication of the measurements. The meter is here used as a period meter.

The operation of this circuit is as follows:

The bridge is adjusted so that when the photocell 53 is dark, junction 107 is at a high positive voltage with respect to junction 106 which is grounded. When the light falls on the photocell, reducing its resistance, the voltage of junction 107 goes negative.

As the light beam traverses the photocell in either direction, the amount of illumination increases from zero to maximum and then decreases to zero in a substantially sinusoidal manner, giving rise to a sine wave current pulse, across input resistor 111 of the counter. Depending on a slope adjustment which is included in the counter equipment, the counter may be triggered by a pulse of positive, or by a pulse of negative slope only, passing from positive through zero to negative. Therefore, the counter will be triggered once by the passage of the beam on the initial swing of the pendulum, and once by the passage of the beam on the return swing. The first triggering action starts the timing operation and the second triggering action stops it. It is immaterial whether triggering occurs at the same location on the initial swing and return swing of the pendulum, but it is essential that successive swings are measured over the same path. That is, the trigger point on the initial swing must remain constant for successive oscillations and, likewise, the trigger point on the return swing must remain constant. When the instrument is used for comparative period measurements only, a difference in location between the initial trigger point and the return trigger point need not be taken into account. If the results are to be converted to values of g, the difference in location between the two points will enter into the constant multiple determined by the relationship of the measured part of the swing to the average amplitude.

The restoring and programming circuits

Figure 6:
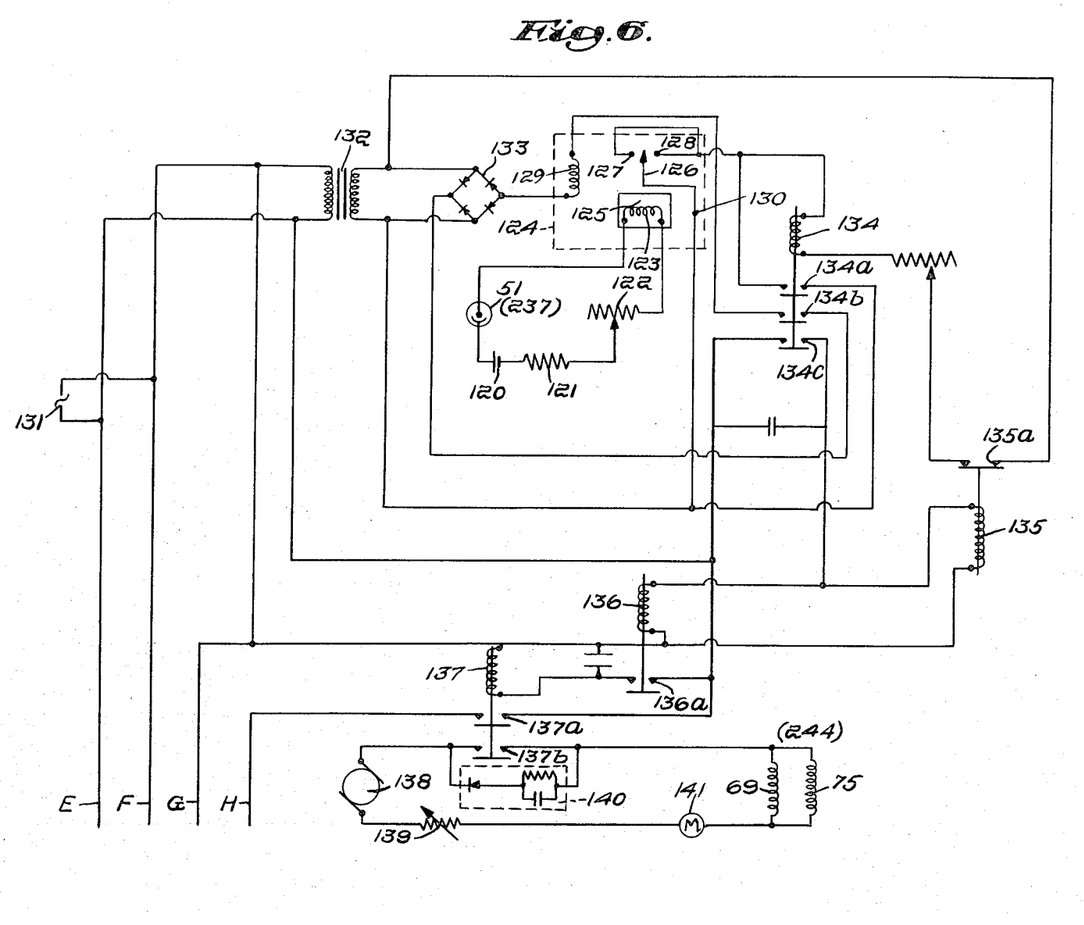
FIG. 6 is an electrical schematic diagram of the restoring circuit.
Figure 6A:
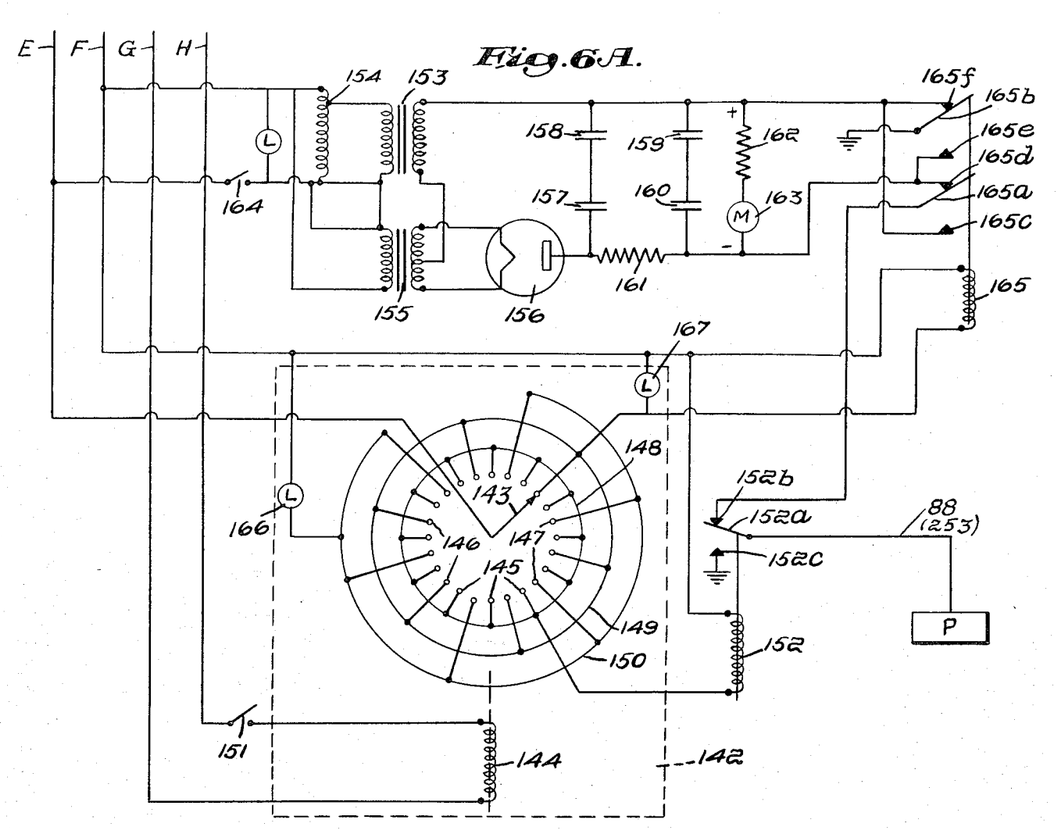
FIG. 6a is an electrical schematic diagram of the programming circuit which operates in conjunction with the circuit of FIG. 6.

The circuits for energizing the restoring coils 69 and 75 and automatically programming successive measurements are shown in detail in FIGS. 6 and 6a. As shown in FIG. 6, photocell 51, which is of a low current output type, is connected in series with a battery 120, a limiting resistor 121, an adjustable resistor 122, and the input coil 123 of a contact galvanometer relay 124. This relay is of conventional construction and has a rotatable armature 125 carrying a needle 126 which, upon rotation of the armature, engages one of two contacts 127 and 128, depending on the direction of rotation. The needle is connected to an input terminal 130. The relay also has a locking coil 129 which, when energized, assists in holding the needle in contact position.

Power for the restoring circuit is supplied from a voltage regulated A.C. source 131 through a step-down transformer 132. Current to the resetting coil of the galvanometer relay is supplied through a full wave rectifier 133 connected to transformer 132.

A power relay 134 is connected to contacts 127 and 128 and is energized by alternating current from the secondary of transformer 132 when needle 126 moves to connect the input contact 130 with either of contacts 127 and 128. Relay 134 has three sets of normally open contacts 134a, 134b, and 134c. An adjustable thermal time delay relay 135, of the type which operates a predetermined time after its coil is energized, controls a pair of normally closed contacts 135a which are connected in the energizing circuit of relay 134.

Contacts 134a are holding contacts for relay 134 and contacts 134b are connected in series with locking coil 129. Contacts 134c are connected in the energizing circuit of a rachet relay 136, which is of a type which operates on every other energization of its coil. Relay 136 controls a pair of normally open contacts which are connected in the energizing circuit of an A.C. relay 137. The latter controls two sets of normally open contacts 137a and 137b. Contacts 137a control the programming circuit and contacts 137b control the energizing circuit to the restoring coils 69 and 75.

Power for the restoring coil circuit is derived from a D.C. source 138, and this circuit includes a variable resistor 139, an anti-surge network 140, bridging contacts 137b, and an ammeter 141.

The leads designated at E, F, G, and H in FIG. 6 are connected to the correspondingly designated leads in FIG. 6a. The programming of the pendulum charging circuit is controlled by a rotary stepping switch, generally indicated by the numeral 142, of the type having a rotating contact member 143 which is advanced step-by-step, upon each energization of a coil 144, to successively engage one of a series of contacts arranged in three sets 145, 146, and 147. The contacts 145 are connected together by a ring 148, contacts 146 by a ring 149, and contacts 147 by a ring 150. The energizing circuit for coil 144 includes a manual switch 151.

Contacts 145 are connected in the energizing circuit of a single pole double-throw relay 152 having an armature 152a, and two contacts 152b and 152c. The armature is connected by cable 88 to the pendulum housing, here designated P, which, as has been previously described, is electrically connected to the pendulum 44 through its suspension 40.

Power for the charging circuit is derived from source 131, by way of leads E, F, through a transformer 153 connected in parallel with a variable transformer 154, and a filament transformer 155. Current from transformer 153 is rectified by means of a rectifying network consisting of diode 156, condensers 157, 158, 159 and 160 and resistor 161, and is delivered to a load resistor 162 connected in series with a voltmeter 163. A manual switch 164 is included in the charging circuit.

Contacts 146 of the stepping switch are connected in the energizing circuit of a double-pole, double-throw relay 165 having armatures 165a and 165b, and contacts 165c, 165d, 165e, and 165f. Armature 165a is connected to contact 152b of relay 152, and armature 165b is grounded. Contacts 165c and 165f are connected to the positive end of load resistor 162, and contacts 165d and 165e to the negative end.

The operation of the restoring and programming circuits is as follows:

The passage of the light beam over photocell 51, as the pendulum swings through position B (FIG. 5), lowers the photocell resistance and causes current to flow in the moving coil 123 of the galvanometer relay. Needle 126 is swung to connect one of contacts 127 or 128 with contact 130, thus energizing relay 134. The closing of contacts 134a establishes a holding circuit for relay 134, and closing of contacts 134b energizes the galvanometer locking coil. The circuit of relay 134 is thus maintained even if the photocell becomes deenergized.

The closing of contacts 134c energizes relays 135 and 136. As stated previously, ratchet relay 136 closes its contacts 136a only on every other energization. This relay is originally set so that the pulse generated by the passage of light over photocell 51 on the initial swing does not cause relay 136 to operate. Therefore, restoring coils 69 and 75 are not energized as the pendulum passes position B on its swing toward position D. Relay 135 opens contact 135a after a predetermined time delay, deenergizing relay 134 and restoring the circuit to its original condition, with both relays 135 and 136 deenergized. When the light beam strikes the photocell 51 on the return swing, as the pendulum moves back through position B toward the start position A, relay 134 is again energized, energizing relays 135 and 136. This time the contacts of relay 136 close. In order to prevent false operation of relay 136, the delay period of relay 135 must be longer than the period during which photocell 51 is energized by passage of the light beam. If the photocell were still illuminated when relay 135 is opened, the circuit to relay 134 would be again closed.

The closing of contacts 136a energizes relay 137, closing contacts 137a and 137b. The closing of the latter contacts energizes the restoring coils 69 and 75, thus causing the shoes 57 and 58 to be attracted to their respective magnet assemblies, and returning the pendulum to its start position A, as previously explained. After the predetermined time delay, relay 135 again opens its contacts 135a, deenergizing relay 134 and allowing contacts 134c to open. This deenergizes relay 136 and the opening of its contacts deenergizes relay 137, allowing contacts 137b to open. The restoring coils 69 and 75 are thus deenergized, after a dwell period determined by the time delay of relay 135, releasing the pendulum for another oscillation.

The closing of contacts 137a, which are closed simultaneously with contacts 137b, as the pendulum passes position B in the return swing of each oscillation, advances the contactor 143 of the stepping switch one step (assuming switch 151 is closed). When contactor 143 is engaged with one of contacts 145, relay 152 is energized, and the pendulum is connected to contact 152c which is grounded. When contact 143 is engaged with one of the contacts 146 or 147, relay 152 is deenergized, and the pendulum is connected to contact 152b.

The charging circuit is continuously energized when switch 164 is closed, and delivers a D.C. voltage across resistor 162. When contactor 143 engages one of contacts 147, relay 165 is deenergized and its armatures are in the position illustrated. The pendulum is thus connected to the negative side of resistor 162, through contact 165a, and the positive side of the resistor is grounded through contact 165f. The pendulum is thus charged negatively with respect to ground.

When contactor 143 is engaged with one of contacts 146, relay 165 is energized. The pendulum is then connected through contact 165c to the positive side of resistor 162, and the negative side of the resistor is grounded through contact 165e. The pendulum is thus charged positively with respect to ground. In order to prevent accidental short circuiting of the secondary of transformer 153, it is desirable to have relay 165 operate more quickly than relay 152. This can be done by using a relay for 152 with a longer armature travel than that of relay 165.

From the foregoing it is apparent that on one swing the pendulum is grounded, on the next charged negatively, on the next grounded, and on the next charged positively. This cycle is repeated as long as the stepping switch is in operation. If it is desired to make a succession of observations at the same potential, the switch 151 may be opened at the appropriate time to stop the stepping switch in the desired position. Pilot lights 166 and 167 indicate whether the pendulum is on negative or positive charge. No light shows when the pendulum is grounded. With the stepping switch stopped, the restoring circuit will continue to recycle the pendulum automatically but the charge of the pendulum will remain at the chosen potential, whether ground, positive or negative.

As the switching operations for restoring and changing the charge on the pendulums generate electric fields which might result in a false signal in the timing circuit, interaction between the timing circuit and the restoring and programming circuit must be avoided. One way of doing this is to render the timer 110 insensitive to signals during the period in which the restoring and charging operations take place. A timer of the type used here has internal circuiting which automatically renders it insensitive to signals for a certain period, referred to as the "display period," after the signal which ends the timing operation is received. This display period is provided for holding the visual indication which in the model referred to consists of lighted numbers, so that the measurement can be observed and recorded. This period can be varied by an adjustment provided on the counter. The display period should be set at a duration longer than the time required for the pendulum to swing from position C back to the start, on the return swing, and the dwell, controlled by relay 135. The end of the display period should occur soon after the pendulum is released for the next swing. The timer goes through a resetting cycle after its display period, and the resetting time is also adjustable. This time should be set so that the resetting cycle is completed before the pendulum reaches position C on the next swing, so that the counter is again in recording condition when the light beam strikes photocell 53 to start the timing operation.

The plane pendulum

A plane pendulum is essentially a mass supported in such a manner as to oscillate under the influence of gravity about a horizontal axis not passing through its center of gravity. The plane pendulum here illustrated is of the type generally referred to as a compound or Kater pendulum. According to conventional calculations, the period of such a pendulum, oscillating through a relatively small angle, may be calculated by the formula $$T = 2\pi \sqrt{\frac{I}{mgh}}$$

where T is the period, I the moment of inertia about the suspension axis, h the distance between the axis of suspension and the center of gravity, and g the acceleration due to gravity.

For any particular pendulum of stable physical characteristics, therefore, as in the case of the torque pendulum, the value of g at any particular time and location may be calculated from the observed period by the formula $$g = \frac{\text{Constant}}{T^2}$$

where the constant is determined by the dimensional and mass distribution characteristics of the pendulum.

The pendulum illustrated in FIGS. 8 through 12 consists essentially of a weight 200 and a counter weight 201 connected together by a pair of rods 202 and 203, and suspended on a knife edge 204. The knife edge rests on a block 205 which is secured by angle brackets 206 and 207 to a plate 208.

Figure 8:
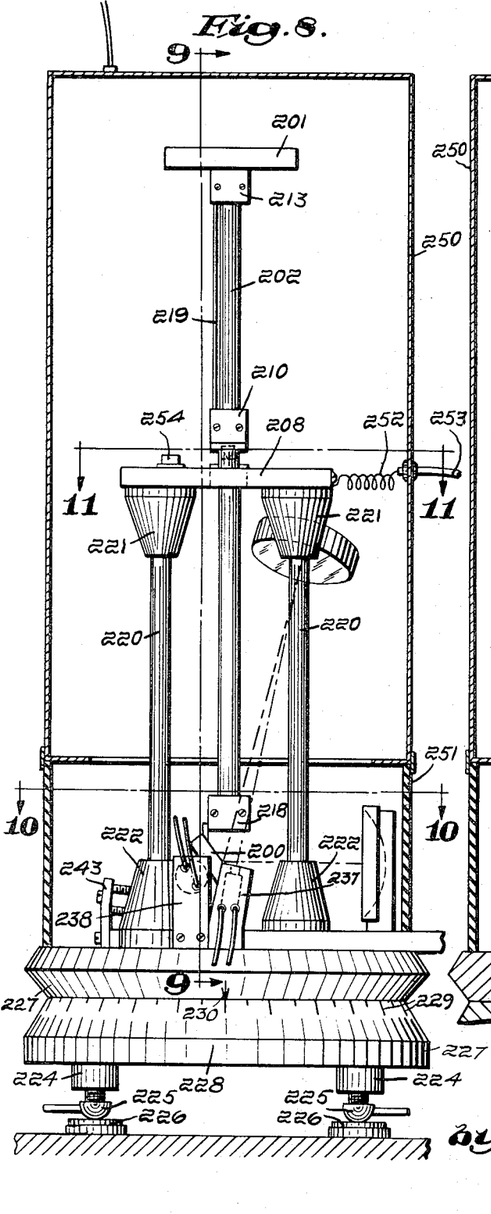
FIG. 8 is a side elevation of a plane pendulum which may be used in an alternative detecting element for the device, the housing being shown in cross-section.
Figure 9:
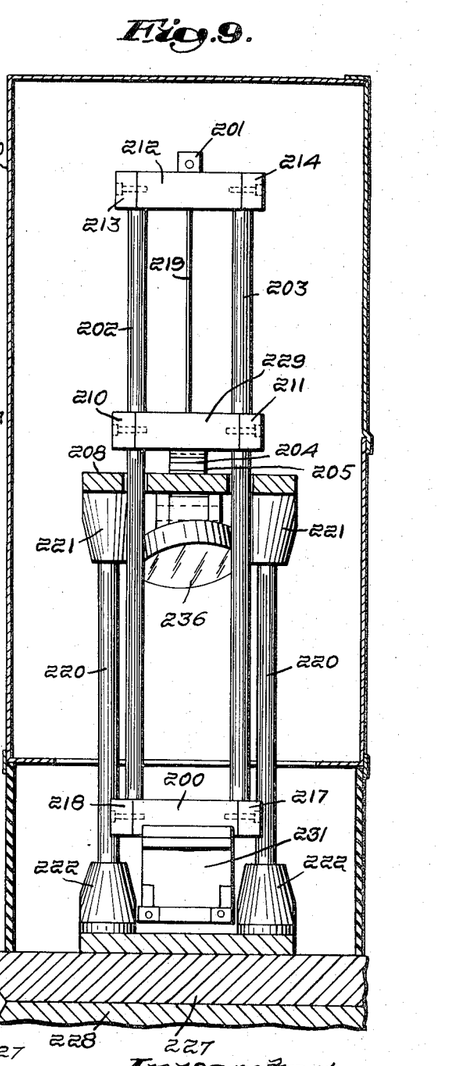
FIG. 9 is a cross-section taken along line 9—9 of FIG. 8, the timing and restoring photocells being omitted for clarity.

The knife edge is mounted on a cross-bar 209 which is clamped to rods 202 and 203 by end blocks 210 and 211 screwed to bar 209. Counterweight 201 is mounted on a similar cross-bar 212 clamped to the rods by end blocks 213 and 214. Weight 201 has a deep threaded hole 215 in which a set screw 216 is threaded. This screw may be moved in and out to balance the pendulum so that it hangs vertically when at rest. Weight 200 is itself a cross-bar and is clamped to rods 202 and 203 by end blocks 217 and 218. The vertical positions of the weights and the suspension point of the pendulum may thus be adjusted and set as desired with respect to the rods.

The three cross-bars and blocks and weight 201 are all made of non-magnetic conductive material. The rods 202 and 203 are made of material of negligible coefficient of expansion, such as quartz, to insure dimensional stability of the pendulum. A light aluminum rod 219 is connected to bar 229 to provide an electrical connection to the upper part of the pendulum. Block 205 and knife edge 204 are made of a hard conductive non-magnetic material.

Plate 208 is supported by four posts 220 of insulating material such as glass or quartz, the upper ends of which are engaged in shoes 221 mounted on the bottom of the plate. The lower ends of the posts are engaged in shoes 222 mounted on the top of a plate 223. This plate is mounted on a base block 227. This block is rotatably mounted on a second base block 228 which carries degree markings 229. Block 227 carries an index mark 230. The entire pendulum assembly may be rotated to a position corresponding to a desired compass bearing, so that readings may be taken with the pendulum oriented in various directions, for example, where it may be necessary to take into account the effect of a large mass, such as a mountain, in the vicinity which would produce a lateral differential in the gravitational field. The directional adjustability also permits the pendulum to be used to determine the direction of approach of seismic waves and similar disturbances.

Block 228 carries, on its under side, four collars 224 into which feet 225 are adjustably screwed. The feet rest on vibration insulating pads 226 supported on a concrete floor or slab.

A bracket 231 is fixed to cross-bar 200 and carries a front surfaced mirror 232 which swings with the pendulum. Plate 223 has an extension 223a on which a light source 233 is mounted. The beam from this light source passes through a collimating lens 234 on to the mirror 232. A concave mirror 236 is adjustably mounted, by means of a bracket 235, on the under side of plate 208. The light beam is reflected from mirror 232 to mirror 236. The latter is tilted sidewise so as to reflect the beam toward the side of plate 223. Two photocells 237 and 238 are mounted on plate 223 in such a position as to lie in the path of the beam reflected from mirror 235 as the pendulum swings.

Figure 10:
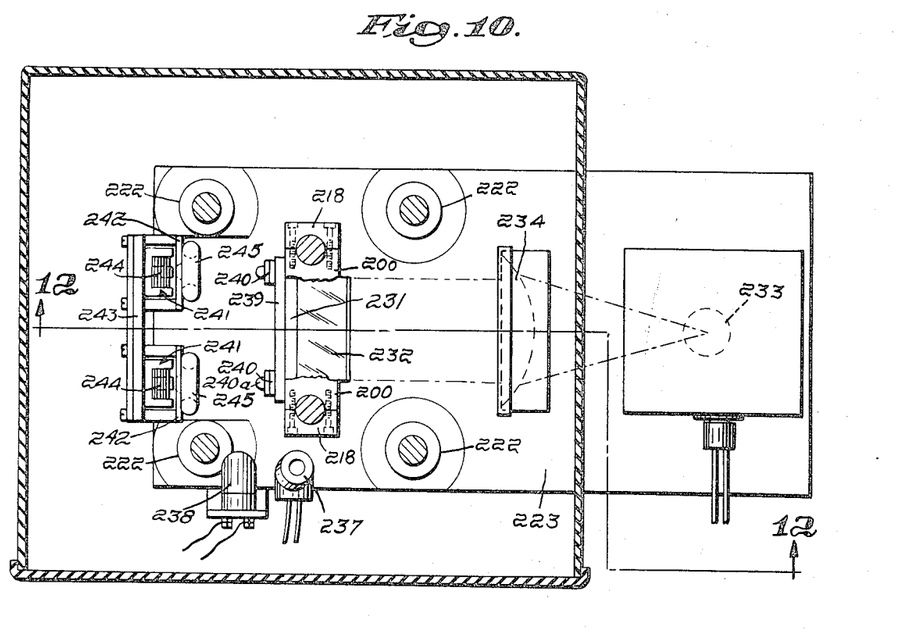
FIG. 10 is an enlarged cross-section taken along line 10—10 of FIG. 8.
Figure 11:
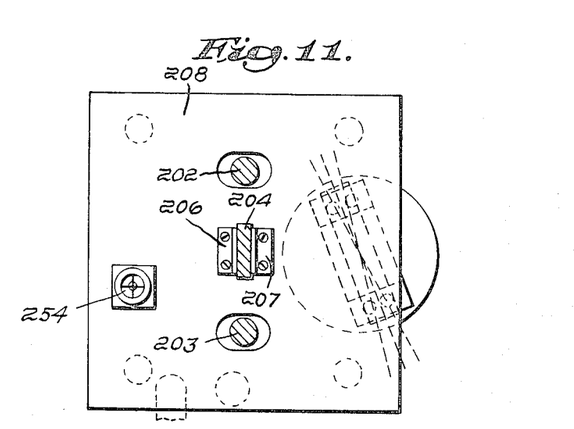
FIG. 11 is an enlarged cross-section taken along line 11—11 of FIG. 8.
Figure 12:
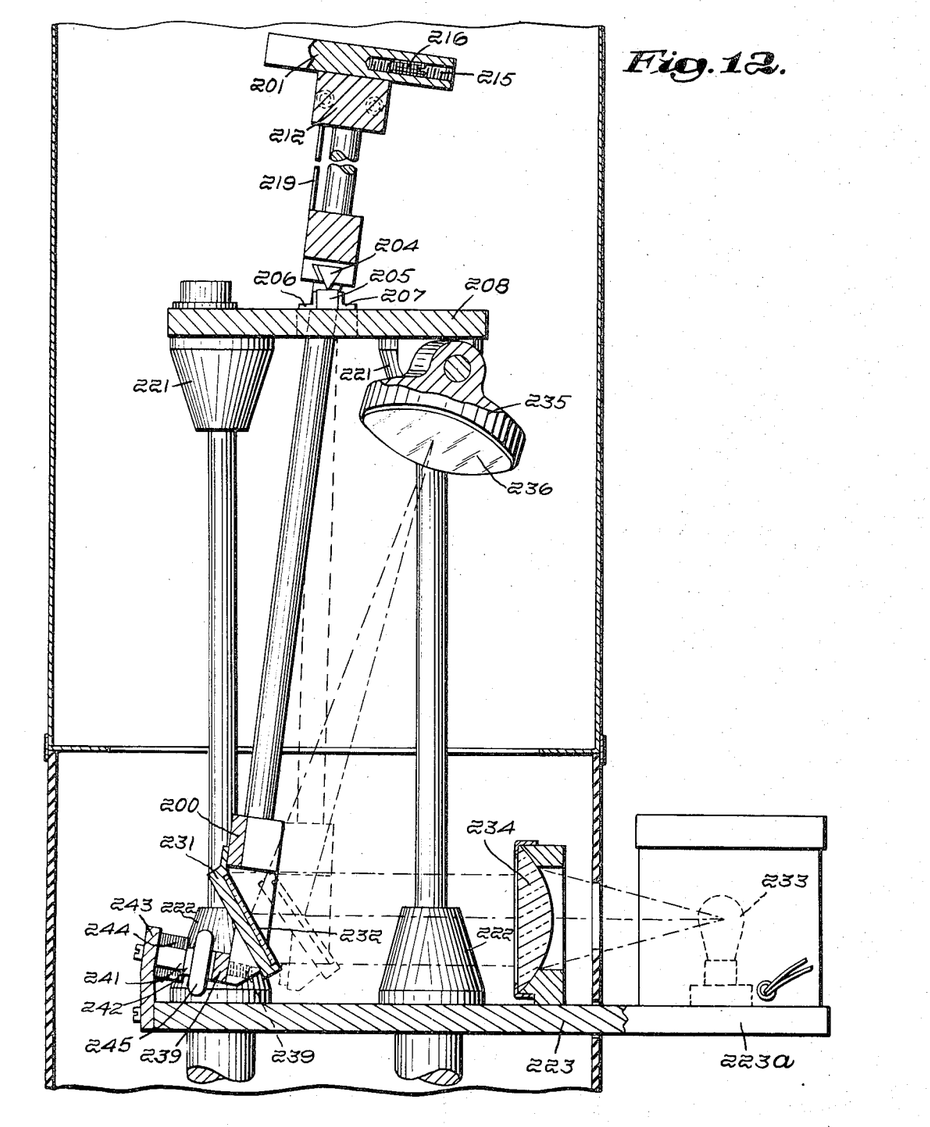
FIG. 12 is a cross-section taken along line 12—12 of FIG. 10.

As best seen in FIG. 10, a bar 239 of non-magnetic material is mounted on the back of bracket 231. A pair of shoes 240, of magnetic material, are mounted on bar 239. These shoes have hemispherical ends 240a. A bracket 243 is mounted on the side of plate 223 and carries a pair of electromagnet assemblies consisting of cores 241, centering plates 242, and energizing coils 244. The plates 242 have conical holes in which the ends 240a of shoes 240 can seat. A pair of de-gaussing coils 245 are mounted in front of plates 242. These electromagnet assemblies and shoes 240 perform essentially the same function as shoes 57, 58 and their related electromagnet assemblies in the case of the torque pendulum, that is, when coils 244, which correspond in function to the restoring coils 69, 75, are energized, shoes 240 are attracted to cores 241 and seat in plates 242, thus bringing the pendulum to rest at a fixed start position from which it is released for each swing. Coils 245 are continuously energized with A.C. from any convenient stabilized source (not shown), and serve to remove residual magnetism from shoes 240 when coils 244 are deenergized and the pendulum released to start its swing. Shoes 240 are also preferably made of material of low retentivity. To facilitate smooth break-away when the pendulum is released, the faces of cores 241 in the vicinity of shoes may be covered with a thin layer of glass or other non-magnetic material so that there is no direct contact between the cores and the shoes.

The double shoes 240 and their corresponding electromagnet assemblies also perform another function. A plane pendulum on a low-friction bearing will tend to precess because of rotation of the earth. The double shoes align the pendulum in the same position for the start of each swing, thus overcoming this tendency.

As the pendulum swings forward from its start position, because of the reversal produced by mirror 236 in the angular movement of the light beam, the beam will strike photocell 237 first and photocell 238 next. On the return swing of the pendulum toward the start position, the beam will pass first over photocell 238 and then over photocell 237. Photocell 237 actuates the restoring circuit, and photocell 238 actuates the timing circuit.

The upper portion of the pendulum and its support are enclosed in a conductive housing 250, which is supported by an insulating housing 251 enclosing the lower part of the pendulum and support and resting on base block 227. A flexible coiled wire 252 connects the housing 250 to plate 208 which is conductive. A cable 253 is connected to housing 250 for the purpose of applying an electric charge to the housing and to the upper part of the pendulum by way of plate 208, block 205, and knife edge 204. Housing 250 has an access panel (not shown) and appropriate windows for passage of the light beam and observation.

Operation of plane pendulum

The same timing, restoring, and programming circuits as those used with the torque pendulum are used with the plane pendulum. In FIG. 7, photocell 238 would take the place of photocell 53. In FIG. 6 photocell 237 takes the place of photocell 51, the restoring coils 244 take the place of coils 69 and 75, and the armature 152a of relay 152 is connected to cable 253 which leads to the pendulum housing 250.

To start the operation, the pendulum is set manually in the start position, with shoes 240 engaged with plates 242. When the pendulum is released, it swings forward (counter-clockwise as viewed in FIG. 12) through the vertical position to a point of reversal, and then returns, toward the start position. On the forward swing, the light beam strikes photocell 237 shortly after the pendulum leaves the start position. Relay 136 is set, however, so as not to operate on this pulse, and coils 244 are not energized. The light beam next strikes photocell 238, and the resulting pulse from this photocell starts the timing cycle of the counter 110 as has been described with respect to photocell 53. On the return swing, the light beam again strikes photocell 238, terminating the timing cycle of the counter. Next, the light beam strikes photocell 237. The resulting pulse causes relay 136 to close, as has been described with respect to photocell 51. The restoring coils 244 are then energized in the manner described with respect to coils 69, 75. The pendulum is drawn into start position and held until time delay relay 135 opens, releasing the pendulum for the next swing.

As has also been previously described with respect to operating of the circuit of FIG. 6 with the torque pendulum, the closing of relay 136 causes the stepping switch contactor 143 to be advanced one step if the switch is in operation. Thus the pendulum will be successively grounded, charged positively, grounded, and charged negatively, on successive swings. If switch 151 is open, the period of successive swings will be timed with the pendulum at the same potential, ground, positive, or negative, depending on the position in which the stepping switch is stopped.

Either the torque pendulum or the plane pendulum may be used to obtain average readings over a number of oscillations in two ways. Successive oscillations may be timed individually and the average of these readings may be calculated. As an alternative, an opaque mask may be placed in front of the timing photocell immediately after the timing operation is started, and left in position for a certain number of oscillations. In this case the restoring circuit is deactivated so that the pendulum swings freely. The grounded pendulum may be used in this manner to make gravitational measurements equivalent to those made by previously known types of gravity meters.

Figure 13:
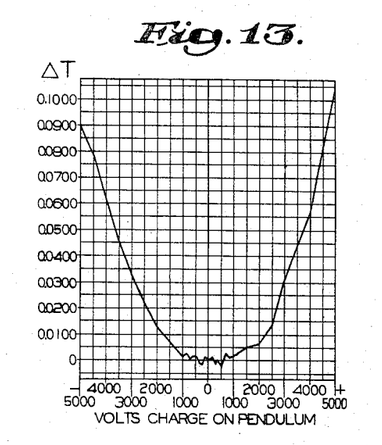
FIG. 13 is a graph illustrating a typical curve of variation of the period of a pendulum with voltage of its charge.

FIG. 13 illustrates a typical curve of variation of the period of a pendulum with voltage of charge. The curve is plotted in terms of $\Delta T$ or change in period, the zero line representing the average period of the pendulum when grounded. It will be noted that on the voltage ranges above one thousand volts positive and two thousand volts negative, for the particular pendulum with which the readings were taken, the period increases on a substantially smooth parabolic curve. The pendulum once calibrated against standard voltages, can thus be used to measure unknown applied voltages with considerable accuracy in these regions. For this purpose, the instrument has certain advantages over conventional voltmeters because there are no moving coils or other delicate parts which are likely to burn out if inadvertently subjected to an overload. The voltage to be measured is applied to the pendulum as a simple charge. The voltage readings are preferably taken by alternately charging and grounding the pendulum as previously described so that correction can be made for changes in period due to other forces, for example, seismic disturbances, by comparing the reading of the charged period to a reading taken immediately afterward with the pendulum grounded.

Figure 14:
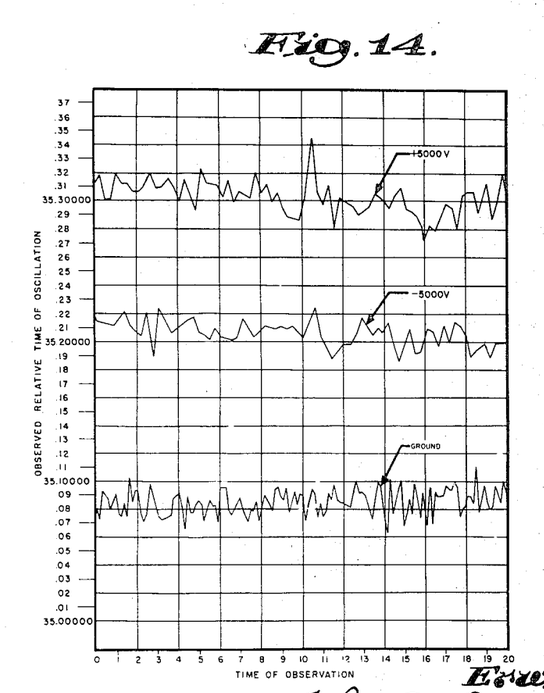
FIG. 14 is a graph of individual measurements taken over a prolonged period with a pendulum recycled automatically and alternately grounded and charged.

It will be noted that the curve in FIG. 13 is asymmetrical, that is, the curve for the positive charge has a steeper slope than the curve for the negative charge. In FIG. 14, a plot of successive readings taken with the pendulum grounded, and charge to 5,000 volts negative and positive, shows that the period is longer when the pendulum is positively charged than when it is negatively charged. In order to resolve any question as to the influence of stray fields from the restoring and automatic cycling circuits, these circuits and all the de-gaussing coils were shut off and measurements were made with the pendulum swinging freely for a number of swings, grounded for the entire series, charged positively to 5,000 volts, and charged negatively to 5,000 volts. The pendulum was started from the same initial position in each case. The plot of successive swings in FIG. 16, consistent with the findings illustrated in FIGS. 13 and 14, shows the period of the positively charged pendulum to be longer than that of the negatively charged pendulum.

Figure 15:
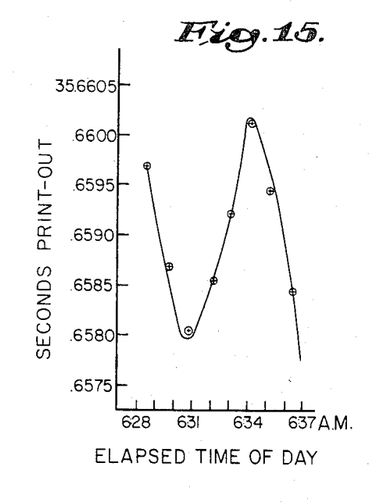
FIG. 15 is an enlarged graph of individual readings taken with the grounded pendulum over a period of about ten minutes.

FIGS. 14 and 15 illustrate typical measurements made with pendulums of the type here described, showing short term variations in the apparent gravitational acceleration which were not detected by other instruments, for example, a seismograph operating during the same period.

The measurements illustrated in FIG. 14 were taken at regular intervals of a long enough duration to allow the pendulum to be brought to rest between each swing by the restoring mechanism and permit the operation of the re-cycling and charging circuits as has been described. The individual readings were taken with the pendulum alternately grounded, charged positively, grounded, and charged negatively. The individual swings were plotted according to the time interval for each observation, and the curves shown in FIG. 14 were obtained by connecting together the plots of successive measurements. The duration of the measured part of the swing is in the neighborhood of thirty-five seconds in this case. It will be noted that the three plots of the readings grounded, charged positively, and charged negatively, all show small but perceptible wave-like variations in the measured period. These variations exceed the order of magnitude of error in the device, and are significantly larger than the noise level of the precise electronic timer employed.

FIG. 15 shows a typical wave-like variation. It will be noted that the period for complete wave is approximately eight minutes. The form of the wave is here shown established by eight individual readings. Other experiments have indicated similar wave-like variations of about five to ten minutes period. At least four individual readings would have to be taken during this period to make the wave-like variation detectable. Therefore, an instrument of this type must be capable of making individual measurements of a duration less than approximately two minutes in order to detect these variations.

The instrument is, in essence, a vertical accelerometer, and has also been used to plot seismic oscillations during periods of known seismic disturbance.

The suspension of the pendulum, for the purpose of making the foregoing types of measurement is made as insensitive to temperature changes as possible. The pendulum can, however, be used to measure temperature by making some element of the suspension, for example, the wire of the torque pendulum, of a material of high coefficient of expansion. The temperature variations can then be calculated according to the known relationship between the variation in length of the suspending wire and the period of the pendulum.

Figure 16:
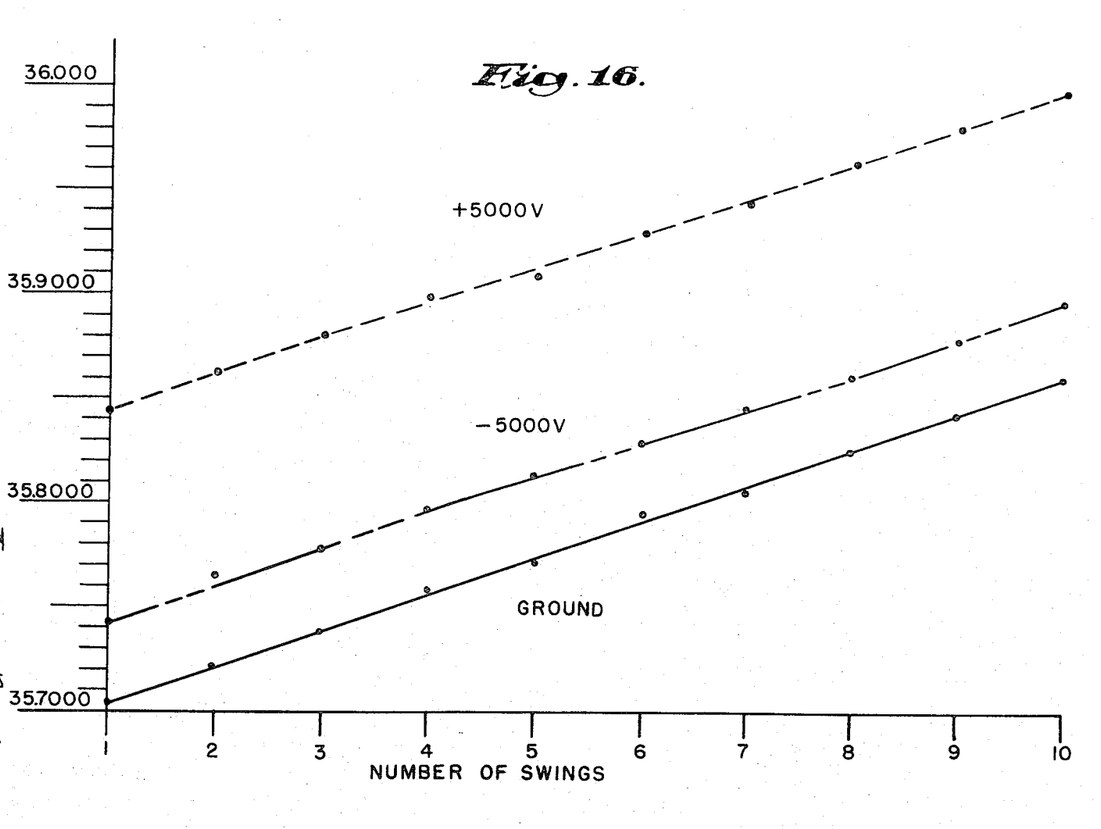
FIG. 16 is a plot of the decay curves of a pendulum grounded and charged positively and negatively, taken with the restoring mechanism inactivated.

The instrument can also be used to measure the damping effect of various materials, for example, a specimen of material of unknown damping characteristics may be used as the suspension filament in the torque pendulum, and the decay curve plotted from readings of individual swings, with the restoring device deactivated, yielding a curve such as that illustrated in FIG. 16. As the slope of the curve can be projected from a relatively small number of swings it is not necessary to allow the pendulum to come to rest, in order to determine comparative damping characteristics of various materials.

Although two forms of pendulums have been described here by way of example, it is understood that other devices which oscillate under the influence of gravity may be used as the detecting element, provided that their natural period is short enough. Likewise other means for restoring the body to a condition of equal potential energy at the start of each measurement, and timing the measurement may be employed if sufficiently precise.

The detailed description is intended as illustrative and my invention is limited only by the scope of the appended claims.

What is claimed is:

1. A force measuring device comprising a body adapted to oscillate under the influence of a force to be measured with a period related to said force, a timing device, means responsive to movement of said body for actuating said timing device to measure individually the periods of successive oscillations of said body, and means for restoring said body to a condition of predetermined potential energy at the beginning of each of its oscillations.

2. A force measuring device comprising a body adapted to oscillate in a gravitational field with a period related to said field, a timing device, means responsive to movement of said body for actuating said timing device to measure individually the periods of successive oscillations of said body, and means for restoring said body to a condition of predetermined potential energy at the beginning of each of its oscillations.

3. A force measuring device comprising a body adapted to oscillate under the influence of the force to be measured with a period related to said force, a timing device for timing individual oscillations of said body, means for sensing movement of said body and actuating said timing device during a first selected portion of each oscillation of said body and for rendering said timing device inoperative during a second portion of each oscillation, a restoring device operable to restore said body to a condition of predetermined potential energy, and a control device which operates said restoring device during the time said timing device is inoperative.

4. An electrical force measuring device as described in claim 3, having means for applying an electric charge to said body during said second portion of any oscillation of said body, and maintaining the charge on said body during said first portion of the same oscillation.

5. A gravity meter comprising a pendulum swinging back and forth along a predetermined path in a gravitational field, a timing device, means responsive to movement of said pendulum for setting said timing device into operation when said pendulum reaches a predetermined position in said path in each swing and terminating operation of said timing device when said pendulum returns to the same position in each swing, and a restoring device operative after termination of the operation of said timing device to restore said pendulum to a condition of predetermined potential energy at the beginning of each swing.

6. A gravity meter comprising a pendulum swinging back and forth in a predetermined path in a gravitational field, an electronic timer of the type which starts timing operation upon input of a first electric pulse and stops upon input of a second electric pulse and which is insensitive to electric pulses for a predetermined display period, means responsive to movement of said pendulum for supplying an electric pulse to said timer each time said pendulum swings past a predetermined position in each swing back and forth, and an electromagnetic restoring device operative only during said display period to restore said pendulum to a condition of predetermined potential energy at the beginning of each swing.

7. A gravity meter comprising a pendulum swinging back and forth in a predetermined path in a gravitational field, an electronic timer of the type which starts its timing operation upon input of a first electric pulse and stops upon input of a second electric pulse and which is insensitive to electric pulses for a predetermined display period, means responsive to movement of said pendulum for supplying an electric pulse to said timer each time said pendulum swings past a predetermined position in each swing back and forth, an electromagnetic restoring device operative when energized to restore said pendulum to a condition of predetermined potential energy at the beginning of each swing, a source of electric charge, a switching device for selectively connecting said pendulum to and disconnecting said pendulum from said source, and control means operative to energize said restoring device and operate said switching device during said display period only.

8. The method of measuring electrical effects in a gravitational field which comprise setting a body, having a natural period of oscillation related to said field, into oscillation in said field, applying an electric charge to said body during a succession of oscillations in a sequence: ground on the first oscillation, charge of one polarity on the second oscillation, ground on the third oscillation, and charge on the fourth oscillation of a polarity opposite that of the charge on the second oscillation, while maintaining said body electrically shielded, and individually timing the periods of said oscillations and comparing the periods so measured with periods obtained when no voltages are applied to said body.

9. A gravity meter comprising: a pendulum oscillating in a gravitational field; means responsive to movement of said pendulum for timing individually each oscillation of said pendulum; a pair of magnetizable elements, one mounted in fixed position and one mounted on said pendulum to oscillate therewith; a magnetizing circuit for magnetizing one of said elements and thereby attracting the other element, said element being disposed to draw said pendulum into a predetermined start position when attracted to each other; means for energizing said circuit each time said pendulum approaches said predetermined position, and deenergizing said circuit and thereby releasing said pendulum after said pendulum has come to rest in said position; a charging circuit for applying electric charge to said pendulum; a stepping switch arranged to change the condition of said charging circuit each time said switch is operated to charge said pendulum in a sequence of ground, positive, ground, negative; means for electrically shielding said pendulum; and means controlled by said energizing and deenergizing means for operating said switch each time said pendulum approaches said predetermined positions.

References Cited

UNITED STATES PATENTS

| | | | |
|---|---|---|---|
| 1,523,149 | 1/1925 | Wheeler | 73—382 |
| 2,000,948 | 5/1935 | Hayes | 73—382 |

RICHARD C. QUEISSER, *Primary Examiner.*

JAMES J. GILL, *Examiner.*

C. I. McCLELLAND, *Assistant Examiner.*